United States Patent [19]
Yates et al.

[11] Patent Number: 6,049,848
[45] Date of Patent: Apr. 11, 2000

[54] SYSTEM AND METHOD FOR PERFORMING HIGH-SPEED TAPE POSITIONING OPERATIONS

[75] Inventors: Neville Yates, Los Gatos; Jeffrey Miller, Menlo Park, both of Calif.

[73] Assignee: Sutmyn Storage Corporation, Santa Clara, Calif.

[21] Appl. No.: 09/116,151

[22] Filed: Jul. 15, 1998

[51] Int. Cl.[7] .................................................. G06F 12/00
[52] U.S. Cl. ........................ 711/4; 711/100; 711/111; 711/170
[58] Field of Search ........................... 711/4, 100, 111, 711/170, 173, 200, 202, 203, 112, 221; 360/48, 61, 72.2, 78.02

[56] References Cited

U.S. PATENT DOCUMENTS

| | | | |
|---|---|---|---|
| 5,438,674 | 8/1995 | Keele et al. | 711/4 |
| 5,805,864 | 9/1998 | Carlson et al. | 395/500 |
| 5,897,661 | 4/1999 | Baranovsky et al. | 711/170 |
| 5,930,793 | 7/1999 | Kleewein et al. | 707/10 |

*Primary Examiner*—John W. Cabeca
*Assistant Examiner*—Mehdi Namazi
*Attorney, Agent, or Firm*—Townsend and Townsend and Crew LLP

[57] ABSTRACT

An improved virtual tape storage device executes tapemark relative commands by examining metadata describing virtual tape volumes. The metadata includes information identifying groups of blocks in the virtual volume and whether a particular group of blocks includes a tapemark.

3 Claims, 7 Drawing Sheets

| LENGTH BYTES | CONTENTS | USE |
|---|---|---|
| 4 | U32 | EXTENT FORMAT IDENTIFIER |
| 4 | U32 | OSD EXTENT #. EACH EXTENT HAS A UNIQUE IDENTIFIER. |
| 4 | U32 < 4G$^2$ | BYTES TOTAL IN THIS EXTENT, EXCLUDING HEADER. SUM OF LENGTHS OF ALL PACKETS OR NON-PACKETIZED BLOCKS (OR FRAGMENTS) IN THE EXTENT. DOES NOT INCLUDE PAD BYTES INSERTED TO FILL OUT DISK LOGICAL BLOCKS. |
| 4 | U32 | TAPE 'FRAME' EQUIVALENTS THIS EXTENT[3] |
| 4 | U32 | TAPE 'FRAME' EQUIVALENTS IN VOLUME PRIOR TO THIS EXTENT |
| 4 | U32 | TAPE 'FRAME' EQUIVALENTS IN SUPERBLOCK FRAGMENT AT END OF PREVIOUS EXTENT |
| 2 | U16 ≤ 4096 | NUMBER OF PACKETS IN THIS EXTENT |
| 2 | U16 ≤ 64 | NUMBER OF TAPE MARKS IN THIS EXTENT |
| 128 | 64@ U16 | PACKET #'S OF PACKETS (OR NON-PACKETIZED BLOCKS) FOLLOWED BY TAPE MARKS. FIRST PACKET AFTER THE HEADER IS PACKET 1. |
| 6 | 6@ U8 | VSN OF VIRTUAL VOLUME, EBCDIC |
| 10 | 10@ U8 | HOSTID, EBCDIC |
| 8 | 8@ U8 | VIRTUAL-VOLUME CLASS, EBCDIC |
| 4 | U32 | QSS SYSTEMID |
| 6 | TIMESTAMP[4] | TIME WRITTEN BY HOST |
| 6 | TIMESTAMP | TIME LAST STAGED IN FROM BES |
| 4 | U32<4G$^2$ | VIRTUAL BLOCK-# OF FIRST PACKET |
| 2 | U16 | PAD BYTES |
| 2 | U16 | !CRC OF FIRST 202 BYTES. CALCULATED ON INVERTED BYTE VALUES, THEN INVERTED. |
| (204) | | (TOTAL BYTES IN EXTENT HEADER) |

SYSTEM AND METHOD FOR PERFORMING HIGH-SPEED TAPE POSITIONING OPERATIONS

BACKGROUND OF THE INVENTION

The present invention relates to storage systems, and in particular, to a method and apparatus for performing high-speed virtual tape positioning operations.

Magnetic tape is a prevalent medium for data storage. A tape drive includes hardware for mounting and dismounting a tape, positioning a tape, and reading and writing data to and from a tape. A controller is also included for controlling the hardware to access requested data and to write data to a specified location. The tape controller may also generate control data which is written to the tape and used by the controller to perform operations on the tape.

Typically, data is physically transferred between a host computer and a tape drive in variable-length units termed blocks. Read, write, and positioning commands generated by the host are based on the storage blocks on the tape and includes such commands as: READ BLOCK, WRITE BLOCK, and SPACE BLOCK.

Figure 8:
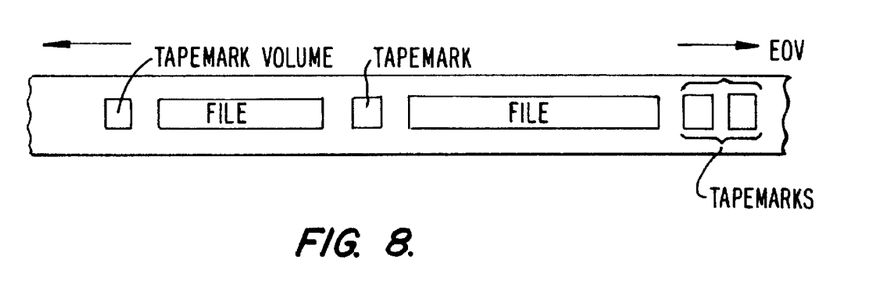
FIG. 8 is a schematic of diagram of blocks of data stored on tape separated by tapemarks.

Data blocks stored on tape are organized in groups forming structures of two kinds: user-defined data sets or "files," and "labels", groups of blocks which identify and describe the tape volume and/or a file. See for example ANSI standard X3.27-1978, level 4. FIG. 8 schematically depicts the storage of block groups on tape.

The data in either kind of structure is stored in contiguous blocks. A tapemark, sometimes called a "filemark," is written on the tape to separate labels and files. This tapemark is a block containing a sequence of bits recognized by a tape controller as a tapemark. Several sets of labels and files may comprise a volume with the end of the volume indicated by an end of volume (EOV) indication, for example two contiguous tapemarks.

If the host is accessing a current file and needs to access a subsequent file it may issue a command, for example "SPACE FILE", requesting a block of data following the next tapemark, that is data displaced from a current block by one tapemark. However, due to the block nature of tape storage, each block must be read until the next tapemark is encountered. Thus, the tape must be physically moved to read each block so that the directive is executed at "mechanical speed".

Thus, the speed of executing tapemark relative directives is limited by the necessity of reading data from tape block by block.

Since data access time is often the limiting factor of system speed the development of faster access to data is crucial to improving system speed and performance.

SUMMARY OF THE INVENTION

According to one aspect of the present invention, a tapemark relative directive is executed by referencing meta-data describing a virtual volume mounted in a virtual tape drive server module. The meta data identifies clusters of data blocks termed "extents" which are transferred as units between a buffer and storage. Records in a meta-database include information describing the extents and whether tapemarks are stored in an extent. A tape drive emulation (TDE) process responds to tapemark relative directive issued by the host. If the tapemark specified is not in the current extent, the TDE process examines the meta-database to determine the location of tapemark displaced from the current block of data by a number specified by the directive. The extent including the location determined moved to a buffer and a block following the specified tapemark is accessed.

According to another aspect of the invention, a tapemark table is built in the meta-database which identifies only extents having tapemarks. The tapemark table is examined if the tapemark specified by the directive is not in the current extent.

According to another aspect of the invention, tapemarks are not stored in an extent. Tapemarks are "virtualized" by storing their locations in the extent header.

Accordingly, since the location of a tapemark is determined by a processor examining the meta-database, the system and method of the invention executes tapemark relative directives at "electronic speed" instead of "mechanical speed".

Other features and advantages of the invention will be apparent in view of the following detailed description and appended drawings.

DETAILED DESCRIPTION OF THE PREFERRED EMBODIMENTS

A virtual tape storage system is a hardware and software product configured to interact with a host computer. Application programs running on the host computer store data output on tape volumes for storage. These tape volumes are embodied in the virtual tape storage system as virtual volumes on virtual tape drives (VTD). A virtual volume is a collection of data, organized to appear as a normal tape volume, residing in the virtual tape storage system. To the host computer and to the application programs, the tape volume contents appear to be stored on a physical tape device of a particular model, with the properties and behavior of that model emulated by the actions of the virtual tape storage system. However, the data may actually be stored as a virtual volume on any of a variety of different storage mediums such as disk, tape, or other non-volatile storage media, or combinations of the above. The virtual volume may be spread out over multiple locations, and copies or "images" of the virtual volume may be stored on more than one kind of physical device, e.g., on tape and on disk.

When an image of the virtual volume is stored on disk, different portions of the volume's contents may be stored on different disk drives and on different, noncontiguous areas of each of the disk drives. The virtual tape storage system maintains indexes which allow the contents of any virtual volume whose image is stored on disk to be read by the host, the virtual tape storage system retrieving scattered parts as needed to return them in correct sequence.

When an image of a virtual volume is stored on tape, it may be stored on a single tape together with images of other virtual volumes, or different parts of the image may be stored on more than one different tape with each part again placed with images, or parts of images, of other virtual volumes. In both of these approaches to tape storage of virtual volume images, the images are said to be "stacked." The virtual volume images may be stored on a variety of different tape device models other than the one being emulated. As with images stored on disk, the virtual tape storage system maintains indexes which allow it to retrieve the contents of any virtual volume stored in a stacked image from the tape or tapes on which it is stored.

A preferred embodiment will now be described with reference to the figures, where like or similar elements are designated with the same reference numerals throughout the several views.

Figure 1A:
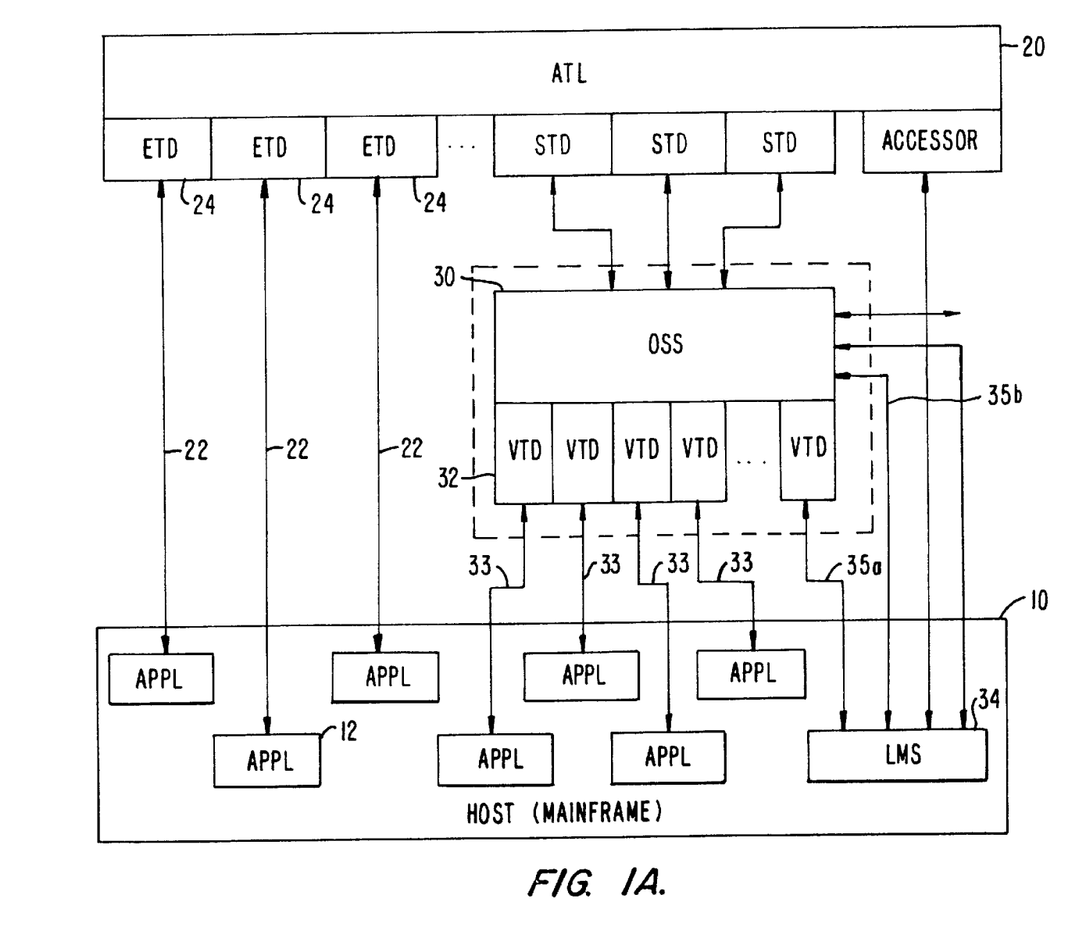
FIG. 1A is a conceptual block diagram of a preferred embodiment of the invention.

FIG. 1A is a high-level block diagram of a digital system in which a preferred embodiment of a virtual tape storage system of the present invention is utilized. In FIG. 1A, a host computer 10, for example an IBM mainframe computer, executes a plurality of applications 12. In practice, host computer 10 typically runs the MVS operating system manufactured by IBM, although other operating systems are well known to one of skill in the art and may also be used. MVS provides I/O services to various applications 12 including I/O for a tape unit 20, which may be an automatic tape library (ATL), or other type of tape storage device. Applications 12 may be coupled directly to tape unit 20 through ESCON tape devices (ETD) 24 by means of a physical interface such as an ESCON 3490 Magnetic Tape Subsystem Interface 22. MVS, the ESCON interface 22, and the host computer 10 are well-known in the art.

Applications 12 may also be coupled to a virtual tape server 30, also referred to herein as an open system server (OSS). OSS is manufactured by the assignee of the present invention. Virtual tape server 30 maintains virtual tape drives 32 (VTDs), which emulate the physical ETDs like those at 24. More details of the VTDs 32 will be presented below. The interface between an application 12 and a VTD 32 is OSS Emulated Device interface 33, which in the preferred embodiment is an ESCON interface.

A library management system (LMS) software module 34 also resides on host 10 and provides services to MVS and virtual tape server 30. LMS 34 is responsible for management of the tape library environment and performs such tasks as fetching and loading cartridges into drives, returning unloaded cartridges to their home locations, etc. The interface between LMS 34 and virtual tape server 30 is the Library Manager Interface with paths 35a and 35b based on two different and distinct protocols.

VTD 32 is a non-physical device that responds as if it were a physical device. In the currently described embodiment, the emulated physical device is an IBM-3490 tape drive, although other devices may also be emulated. VTD 32 responds to commands issued on a channel in the same fashion as the emulated technology. Thus, the absence of a physical tape device may be unknown to application 12.

Applications 12 typically store data in tape volumes. Tape volumes are well-known data structures. A "virtual volume" is a collection of data and metadata that, taken together, emulate a real tape volume. When "mounted" on a VTD, these virtual volumes are indistinguishable from real tape volumes by the host computer. In this context, "data" refers to data output by the host to be stored on tape and "metadata" refers to information generated by virtual tape server 30 which permits the emulation of real tape drives and volumes.

Figure 1B:
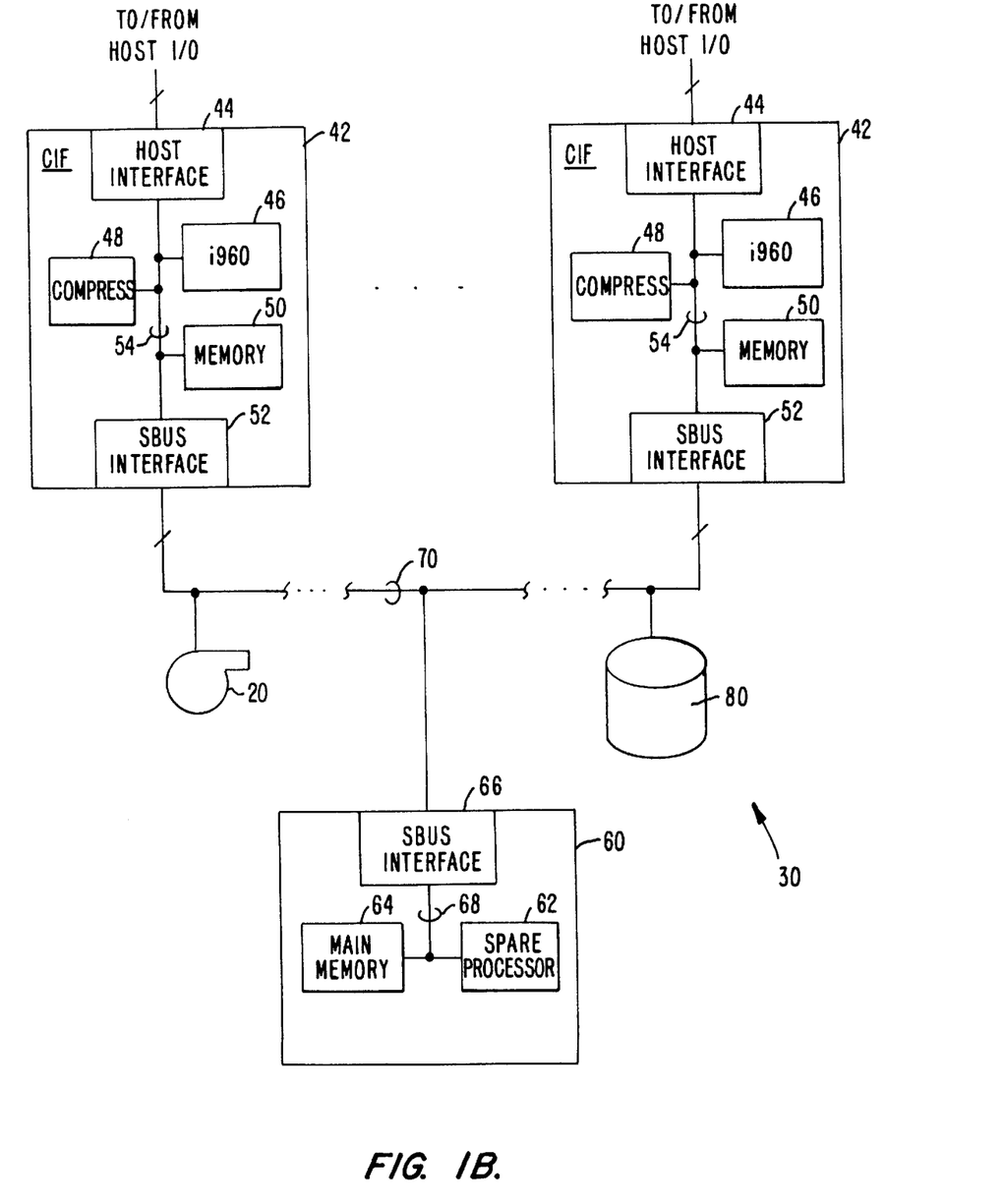
FIG. 1B is a block diagram of a preferred embodiment of a tape drive emulating (TDE) system according to the present invention.

FIG. 1B is a high level block diagram of a part of virtual tape server 30 utilizing an embodiment of the present invention that may be coupled to one or more host computers 10 (FIG. 1A). Host computers 10 are typically large mainframe computers running an operating system such as MVS, and various application programs.

A plurality of channel interfaces (CIFs) 42 are coupled to host I/O channels (not shown) to transfer data between host 10 and virtual tape server 30.

Each CIF 42 includes a host interface 44, an embedded processor 46, a data formatter 48 for performing data compression and other functions, a buffer memory 50, an SBUS interface 52, and an internal bus 54. In the preferred embodiment, the embedded processor 46 is a model i960 processor manufactured by Intel Corporation.

A main controller 60 is coupled to CIFs 42 and includes a main processor 62, a main memory 64, an SBUS interface 66, and an internal bus 68. In the preferred embodiment, the main processor is a SPARC computer manufactured by Sun Microsystems, Incorporated. CIFs 42 and main controller 60 are coupled together by a system bus 70, which is an SBUS in the preferred embodiment.

Virtual tape server 30 stores host data in virtual volumes mounted on VTDs 32. In one preferred embodiment, the data is originally stored on staging disks 80. Because virtual tape server 30 must interact with the host as if the data were actually stored on physical tape drives, a data structure called a virtual tape drive descriptor is maintained in main memory 64 for each VTD 32. The virtual tape drive descriptor contains information about the state of the associated VTD 32. Additional structures, including a virtual tape "volume" structure and other structures subordinate to it, register the locations at which data is physically stored, among other information.

Subsequently, data may be transferred from staging disks 80 to one or more magnetic tape units 20. As mentioned above, tape units 20 may be individual tape units, automatic tape libraries (ATLs), or other tape storage systems. However, the location and other properties of the data is still defined in terms of the virtual tape volume structures in memory and stored in a disk-based control data set.

An example will help clarify the meaning of the terms. If application 12 intends to write data to tape, it requests that a tape be mounted on a tape drive. LMS intercepts the request and causes a virtual volume to be mounted on one of the VTDs 32 to receive the application output, which is delivered by the ordinary tape output programs of the MVS operating system. Blocks of data received by virtual tape server 30 are "packetized", the packets are grouped together in clusters with a fixed maximum size, called "extents", and the extents are written to staging disks 80 in virtual tape server 30. The staging disk space is treated as collections, called regions, of fixed-size space units called extents. Thus, data stored or to be stored in an extent is transferred between the controller and the staging disks during staging disk read/write operations.

Often the extents containing data from one virtual tape are scattered over several disk drives. All information about the packetization, such as packet grouping in extents and extent storage locations, required to reassemble the volume for later use by the host is metadata. Part of the metadata is stored with each extent and part is stored on nonvolatile storage in virtual tape server 30, separate from the extent storage.

Data transferred from a host to a tape drive is sequential. The packets are stored in an extent in order sequentially by block number. A system for serializing packets is disclosed in the commonly-assigned co-pending application entitled "Data Serialization", filed Jul. 15, 1998 (S/NO9/116,151).

Figure 2A:
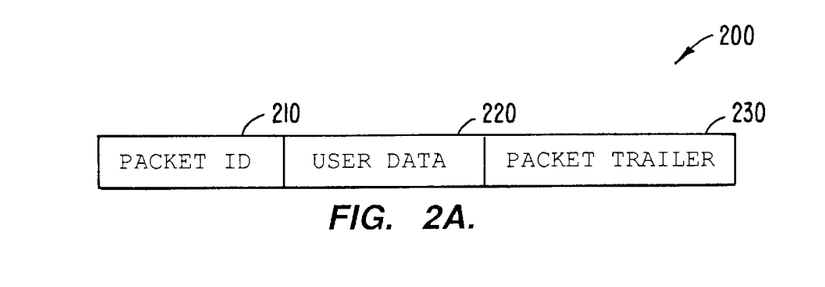
FIG. 2a is a representation of a packet.
Figure 2B:
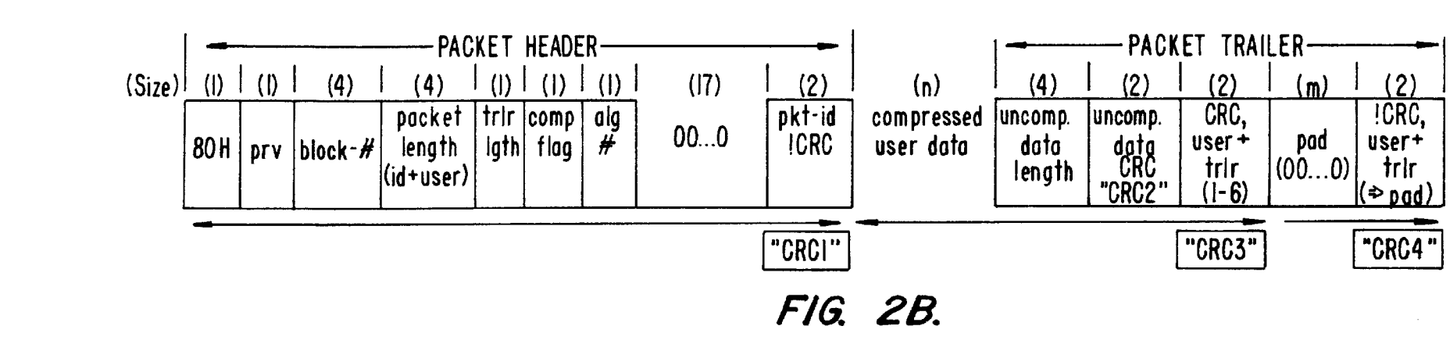
FIG. 2b is a representation of packet contents for compressed user data.
Figure 2C:
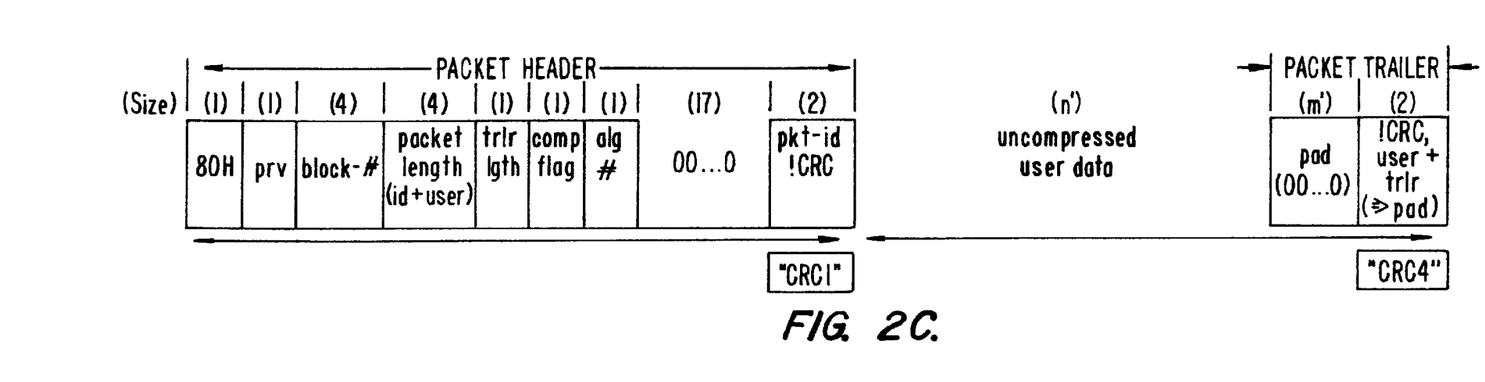
FIG. 2c is a representation of packet contents for uncompressed user data.

Formatting a data block under this method produces a "packet" 200 as shown in FIG. 2. Packet 200 has a header 210 that includes, for example, a Packet-Id, user-data 220, and a trailer 230. Packet 200 is shown in more detail in FIGS. 2b and 2c. Packet 200, which may conform, for example to ANSI standards X3.224-1994 and X3.225-1994, contains a version of the hosts data block, compressed or, optionally not compressed, and descriptive control information such as the sequential number of the block in the sequence of all blocks written to a virtual tape volume, the lengths of the block, before and after compression, flags signaling whether compression was used and which of allowable compression algorithms was used, and calculated "CRC" check characters useful for verifying that packet 200, when transmitted from one storage system component to another, survived without corruption. In other words, the parts of packet 200 make the formatted block substantially self-describing.

When packets comprising an image of a virtual tape volume are stored on disks or as a stacked image on tapes, they are accompanied by records of metadata describing the virtual volume affiliation of any co-located group of stored packets and specifying where, in the sequence of the packets, tape or file "marks" were requested by the host to be inserted in the stream to mark certain boundaries of block groups for the later convenience of the host in positioning within the sequence.

Figure 3:
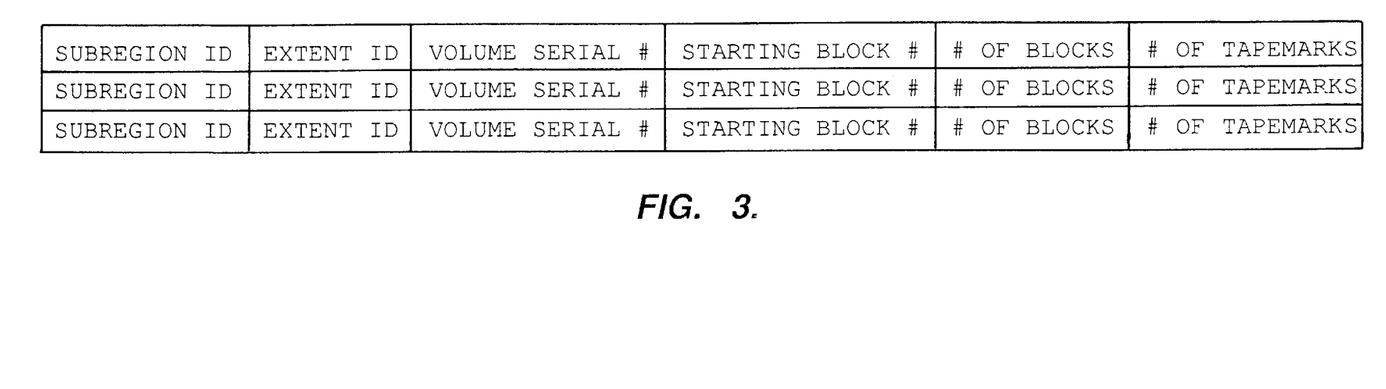
FIG. 3 is a schematic diagram of a portion of a meta-database extent table.

The operation of a preferred embodiment of a method for executing tapemark relative command will now be described with reference to FIGS. 3–5. FIG. 3 depicts a portion of a meta-database describing a mounted virtual volume stage on staging disks 80.

In FIG. 3 each horizontal line is termed a record and stores meta-data describing an extent in the mounted virtual volume. Each record includes the volume serial number of the virtual volume of which the extent content is a part, starting block number identifying the block number of the first of the sequential packets stored in the extent, the number of blocks (packets) stored in the extent, the number of tapemarks stored in the extent, the ID of the extent, and other information not relevant to the currently described function.

Figure 4:
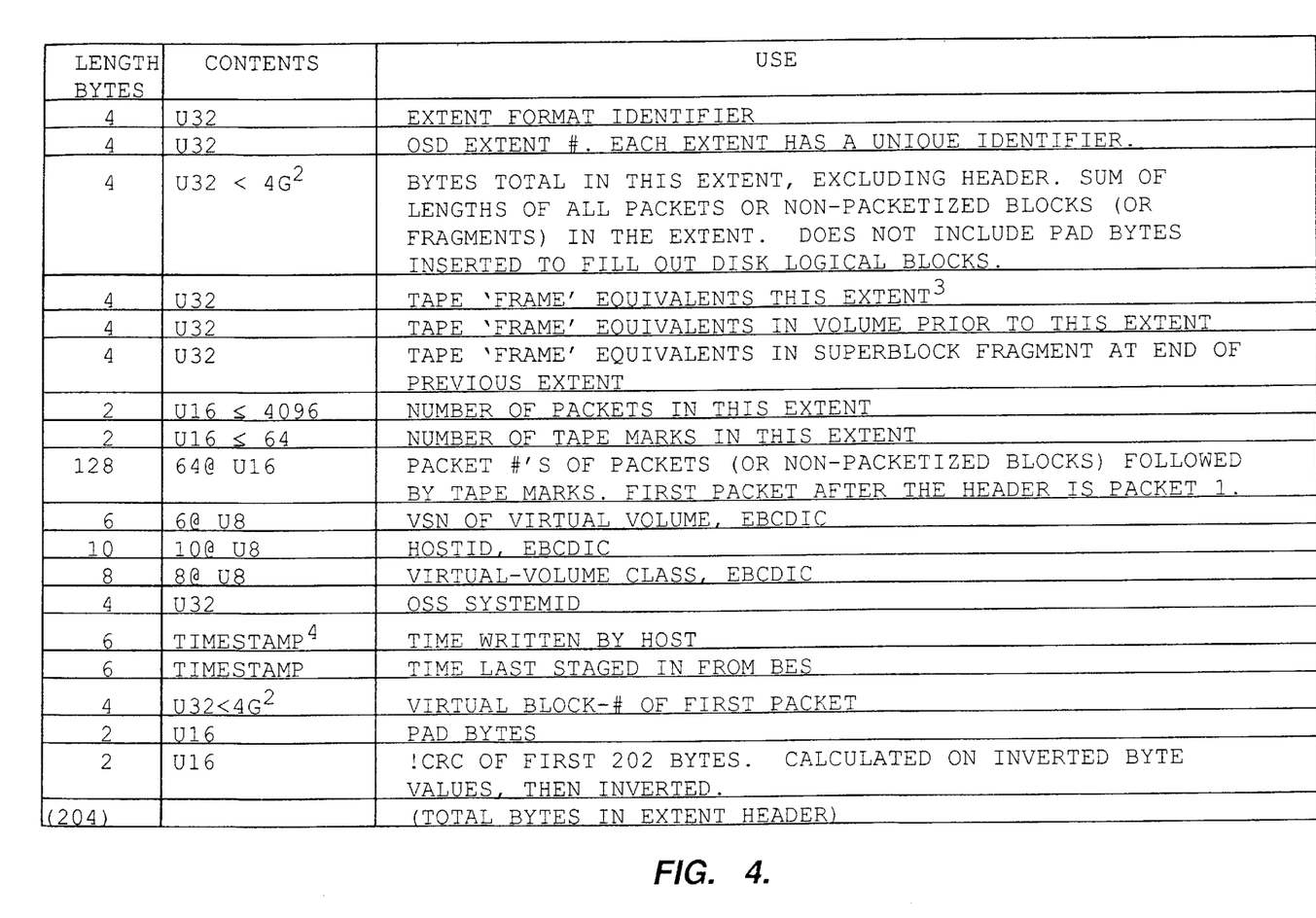
FIG. 4 is a table describing the entries in an extent header.

FIG. 4 is a table describing the information stored in an extent header, which is read from the staging disk as part of the extent. For the currently-described function, the most important information is the field encoding the Packet #'s of packets by tapemarks. In the currently described embodiment, tapemarks are not stored as data packets in an extent. Instead, the tapemarks are "virtualized" and information concerning the location of tapemarks is stored in the extent header.

Figure 5:
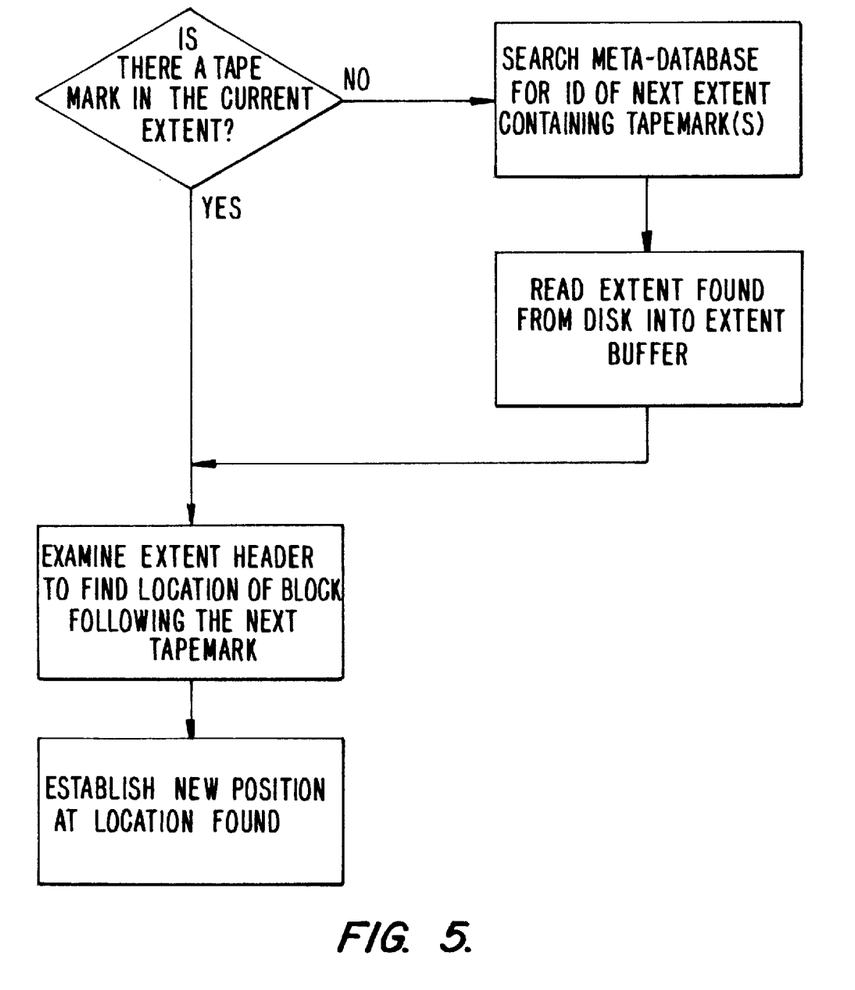
FIG. 5 is flow chart depicting the steps for performing the method of a first preferred embodiment of the invention.

FIG. 5 is a flow-chart depicting the operation of responding to a tape-mark relative positioning command relating to a currently mounted volume stage in the staging disks. The command requests that the tape be positioned from a current position to a new position to access data in the block immediately following the number (n) of tapemarks specified in the command. A TDE process, executing on the CIF controller, responds to the command, and in cooperation with the main controller, performs the functions described below.

The flow chart depicts the operation of a FORWARD SPACE FILE command where n=1. The first step is to examine the header of the current extent to determine whether there is another virtual tapemark in the extent. If so then a position just before the block following the next virtual tapemark is established.

If there are no additional virtual tapemarks in the current extent then the controller searches the meta-database to identify the next extent storing a packet following a virtual tapemark. The identified extent is read from the staging disk to an extent buffer and the extent header is examined to identify the packet following the next tapemark. A position just before the identified block is then established.

The extension of the process to tapemark relative commands for n>1 is straightforward because each extent record in the meta-database identifies the number of virtual tapemarks stored in each extent.

A second embodiment of the invention will now be described. During a tape write operation packets are sequentially stored in the extent buffer and then transferred to the staging disks. When the host requests insertion of tapemarks the location of the tapemarks is stored in the extent header. Additionally, records are inserted into a tapemark table in the meta-database.

Figure 6:
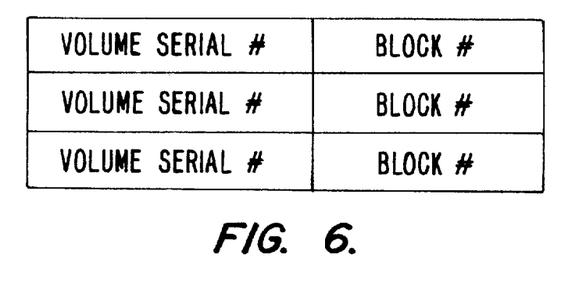
FIG. 6 is schematic diagram of a portion of a meta-database tapemark table.

FIG. 6 schematically depicts on example of the structure of the tapemark table. The table is organized in increasing order of Block ID numbers for tapemark blocks in the mounted virtual volume. Each record in the table identifies one block number of tapemark block and the volume serial number of the virtual volume in which the tapemark belongs.

Figure 7:
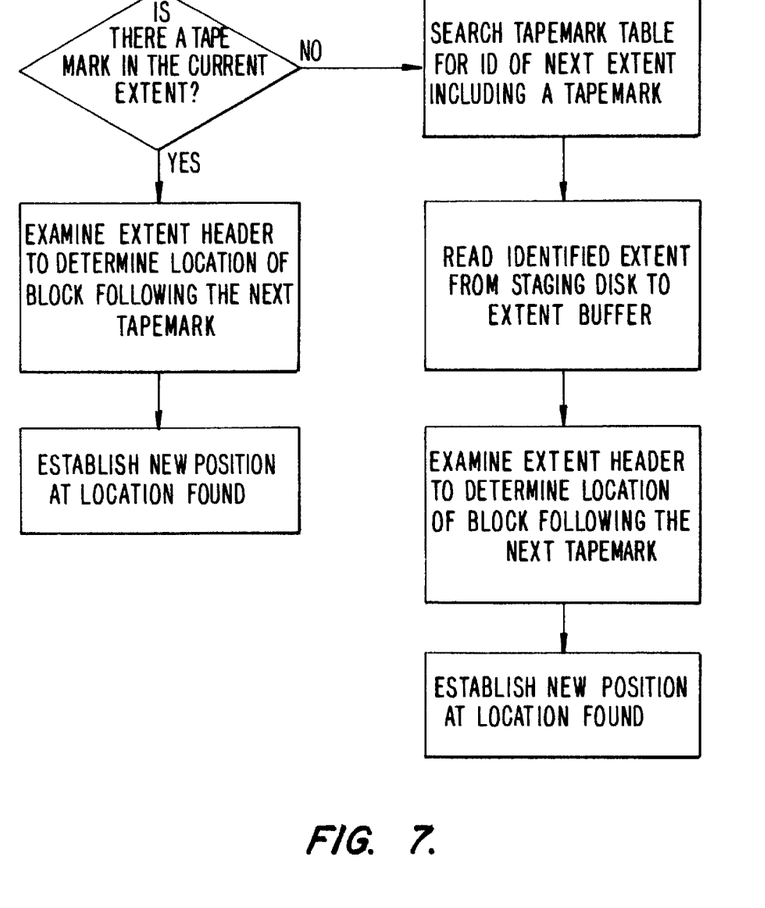
FIG. 7 is a flow chart depicting the steps for performing the method of a second preferred embodiment of the invention.

FIG. 7 is a flowchart of a process for reading a block following the next tapemark. If there are no additional tapemarks in the current extent the tapemark table is examined, in combination with the extent descriptor table, to identify the next extent storing a virtual tapemark.

While the above is a complete description of specific embodiments of the invention, various modifications, alternative constructions, and equivalents may be used. Therefore, the above description should not be taken as limiting the scope of the invention as defined by the claims.

What is claimed is:

1. A method of performing tapemark relative commands issued by a host computer to a virtual tape drive server module, with the host transferring blocks of data and requesting that tapemarks be inserted into written data streams to mark certain boundaries of block groups for the later convenience of the host in positioning within data, with the virtual tape drive server for receiving commands from the host to store and retrieve data from nonphysical virtual tape volumes, for storing metadata describing the actual storage of the virtual tape volume contents, and with the virtual tape drive server module including an extent buffer for buffering data received from the host or requested by the host, said method comprising:

storing a sequences of blocks of data in a virtual volume into the extent buffer;

building an extent header identifying the location of tapemarks within the extent buffer and including an extent ID number;

storing the sequence of blocks and the extent header as an extent;

building a record in the meta-database including the extent ID number and the number of tapemarks included in the extent;

receiving a tapemark relative command specifying a desired number of tapemarks;

examining the extent header of a current extent stored in the extent buffer to determine the number of tapemarks in the extent following a current block;

if the number of tapemarks determined is greater than the desired number, accessing the block in the current extent following the desired number of tapemarks displaced from the current block;

if the number determined is less than the desired number, examining the meta-database to identify the extent storing a desired block following the desired number of tapemarks displaced from the current block;

reading the identified extent into the extent buffer;

accessing the desired block following the desired number of tapemarks displaced from the current block.

2. A method of performing tapemark relative commands issued by a host computer to a virtual tape drive server module, with the host transferring blocks of data and requesting that tapemarks be inserted into written data streams to mark certain boundaries of block groups for the later convenience of the host in positioning within data, with the virtual tape drive server for receiving commands from the host to store and retrieve data from non-physical virtual tape volumes, for storing metadata describing the actual storage of the virtual tape volume contents, and with the virtual tape drive server module including an extent buffer for buffering data received from the host or requested by the host, said method comprising:

storing a sequences of blocks of data in a virtual volume into the extent buffer;

building an extent header identifying the location of tapemarks within the extent buffer and including an extent ID number;

storing the sequence of blocks and the extent header as an extent;

building a tapemark table in the meta-database identifying all staged extents including tapemarks;

receiving a tapemark relative command specifying a desired number of tapemarks;

examining the extent header of a current extent stored in the extent buffer to determine the number of tapemarks in the extent following a current block;

if the number of tapemarks determined is greater than the desired number, establishing a position at the block in the current extent following the desired number of tapemarks displaced from the current block;

if the number determined is less than the desired number, examining the tapemark table in the meta-database to identify the extent storing a desired block following the desired number of tapemarks displaced from the current block;

reading the identified extent into the extent buffer;

establishing a position at the desired block following the desired number of tapemarks displaced from the current block.

3. A system for executing tapemark relative commands issued by a host computer, the system including a virtual tape drive server module, with the host transferring blocks of data and requesting that tapemarks be inserted into written data streams to mark certain boundaries of block groups for the later convenience of the host in positioning within data, said system comprising:

a channel interface, included in the virtual tape drive server and coupled to the host computer, for receiving commands from the host to store and retrieve data from nonphysical virtual tape volumes, and including a channel interface (CIF) controller for executing a tape drive emulation (TDE) process;

a database store for storing metadata describing the actual storage of the virtual tape volume contents;

an extent buffer, included in the virtual tape drive server, for buffering data received from the host or requested by the host, said extent buffer for storing a sequence of blocks of data in a virtual volume into the extent buffer, identifying the location of tapemarks within the extent buffer and including an extent ID number;

with said CIF controller executing a TDE process for:

storing the sequence of blocks and the extent header as an extent;

building a record in the meta-database including the extent ID number and the number of tapemarks included in the extent;

receiving a tapemark relative command specifying a desired number of tapemarks;

examining the extent header of a current extent stored in the extent buffer to determine the number of tapemarks in the extent following a current block;

if the number of tapemarks determined is greater than the desired number, establishing a position at the block in the current extent following the desired number of tapemarks displaced from the current block;

if the number determined is less than the desired number, examining the meta-database to identify the extent storing a desired block following the desired number of tapemarks displaced from the current block;

reading the identified extent into the extent buffer;

establishing a position at the desired block following the desired number of tapemarks displaced from the current block.

* * * * *